United States Patent
Stanciu et al.

(10) Patent No.: US 10,461,883 B2
(45) Date of Patent: Oct. 29, 2019

(54) COMMUNICATION LINK ADJUSTMENTS IN WIRELESS NETWORKS BASED UPON COMPOSITE LQI MEASUREMENTS

(71) Applicant: FREESCALE SEMICONDUCTOR, INC., Austin, TX (US)

(72) Inventors: Mihai Ionut Stanciu, Bucharest (RO); Khurram Waheed, Austin, TX (US)

(73) Assignee: NXP USA, Inc., Austin, TX (US)

( * ) Notice: Subject to any disclaimer, the term of this patent is extended or adjusted under 35 U.S.C. 154(b) by 139 days.

(21) Appl. No.: 15/260,926

(22) Filed: Sep. 9, 2016

(65) Prior Publication Data

US 2017/0366296 A1 Dec. 21, 2017

(30) Foreign Application Priority Data

Jun. 21, 2016 (RO) ................. A201600444

(51) Int. Cl.
| | |
|---|---|
| *H04B 17/336* | (2015.01) |
| *H04B 17/318* | (2015.01) |
| *H04W 84/18* | (2009.01) |
| *H04W 4/80* | (2018.01) |
| *H04L 1/00* | (2006.01) |

(52) U.S. Cl.
CPC ......... *H04L 1/0002* (2013.01); *H04B 17/318* (2015.01); *H04B 17/336* (2015.01); *H04L 1/0001* (2013.01); *H04L 1/0026* (2013.01); *H04W 4/80* (2018.02); *H04W 84/18* (2013.01)

(58) Field of Classification Search
CPC ......... H04W 52/0245; H04W 52/0225; H04W 16/14; H04B 17/24; H04B 17/309; H04B 17/318; H04B 17/345; H04B 2201/709709; H04L 1/0001; H04L 1/0023; H04L 1/0027; H04L 1/0033; Y02D 70/00; Y02D 70/1224

See application file for complete search history.

(56) References Cited

U.S. PATENT DOCUMENTS 5,697,056 A * 12/1997 Tayloe ............... H04B 7/18543
455/13.4
7,187,646 B2  3/2007 Schramm
(Continued)

OTHER PUBLICATIONS

Zheng, G. et al., "A Link Quality Inference Model for IEEE 802.15.4 Low-Rate WPANs", 2011 IEEE Global Telecommunications Conference, 6 pages.

*Primary Examiner* — Marsha D Banks Harold
*Assistant Examiner* — Dharmesh J Patel (57) ABSTRACT

Methods and systems are disclosed to adjust communication links within wireless networks based upon composite link quality indicators (LQIs). Packet communications are received by a network node through a communication link from a separate network node within a wireless network. The network node can also be configured to transmit packet communications from the network node through the communication link to the separate network node. The network node generates composite LQI measurements for the received packet communications, and the composite LQI measurements are based upon signal strength measurements for the received packet communications and also based upon signal quality measurements for the received packet communications. The network node then adjusts the communication link based upon the composite LQI measurements.

18 Claims, 7 Drawing Sheets

(56) References Cited

U.S. PATENT DOCUMENTS

| | | |
|---|---|---|
| 7,558,818 B2 | 7/2009 | Joshi et al. |
| 7,760,689 B2 | 7/2010 | Shin et al. |
| 2014/0118145 A1* | 5/2014 | Wawrzynak et al. |
| 2014/0321294 A1* | 10/2014 | Nagel ............... H04L 43/08 370/252 |

* cited by examiner

COMMUNICATION LINK ADJUSTMENTS IN WIRELESS NETWORKS BASED UPON COMPOSITE LQI MEASUREMENTS

TECHNICAL FIELD

This technical field relates to packet communications within wireless networks and, more particularly, to management of communication links for network nodes within wireless networks.

BACKGROUND

In a wireless network, each network node can communicate with one or more other network nodes, and these communications can take multiple different paths to reach a particular destination node. Because of the nature of such a wireless network, network nodes can typically adjust or manage these communication links to improve link quality when poor link quality is deemed to adversely affect user experience. For example, where a current communication link from a network node to the next network node within a network communication path degrades, the network node can adjust transmit/receive parameters for the communication link or can adjust the communication link so that one or more different network nodes are used for the communication path. These adjustments by the network node can thereby cause an overall adjustment in the communication path through the wireless network.

For network nodes operating in IEEE Standard 802.15.4 compatible networks, link quality is often determined based upon LQI (link quality indicator) measurements. An LQI measurement is a characterization of the link quality for packet communications received through the communication link, and LQI measurements are typically implemented as a scaled version of received signal level. Received signal level is usually represented by an RSSI (Received Signal Strength Indicator) measurement for the received packet communications. LQI measurements are performed for each received packet and can be associated with a digital LQI value, for example, an 8-bit digital value with a minimum LQI value being represented by 0x00 (i.e., "00" in hexadecimal) and with a maximum LQI value being represented by 0xFF (i.e., "FF" in hexadecimal). The RSSI-based LQI measurements can then be used by network nodes to determine link quality for received packets and to adjust communication links where link quality is deemed inadequate.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Methods and systems are disclosed to adjust communication links within wireless networks based upon composite link quality indicators (LQI) measurements. For disclosed embodiments, packet communications are received by a network node through a communication link from a separate network node within a wireless network. The network node can also be configured to transmit packet communications from the network node through the communication link to the separate network node. The network node generates composite LQI measurements for the received packet communications, and the composite LQI measurements are based upon signal strength measurements for the received packet communications (e.g., RSSI (receive signal strength indicator) measurements) and are also based upon signal quality measurements for the received packet communications (e.g., SNR (signal-to-noise ratio) measurements or demodulation quality measurements). The network node then adjusts the communication link based upon the composite LQI measurements. The composite LQI measurements can also be based upon weighted combination of the RSSI measurements and the SNR measurements, and additional parameters can also be used such as symbol correlation magnitudes and/or LQI bias levels. In addition, one or more low/high LQI thresholds can also be used to determine adjustments are made to communication links between network nodes based upon the composite LQI measurements. A variety of additional or different features and variations can also be implemented.

In operation, the disclosed embodiments advantageously provide a more effective indication of link quality by combining received signal strength measurements (e.g., RSSI measurements) with received signal quality measurements (e.g., SNR measurements or demodulation quality measurements) to generate composite LQI measurements. By combining these signal strength and signal quality measurements, the resulting composite LQI measurements effectively distinguish high signal levels due to interfering blocker signals from high signal levels due to desired received signals. In contrast, prior RSSI-based LQI measurements are not able to differentiate between strong signal levels due to desired signals or due to interfering blocker signals. Further, prior RSSI-based LQI measurements maintain a strong link quality indication even when received signals are above maximum receive levels and subject to clipping. As such, the embodiments disclosed herein that use composite LQI measurements allow for network nodes to more effectively manage their communication links within wireless networks as compared to prior RSSI-based solutions.

Figure 1:
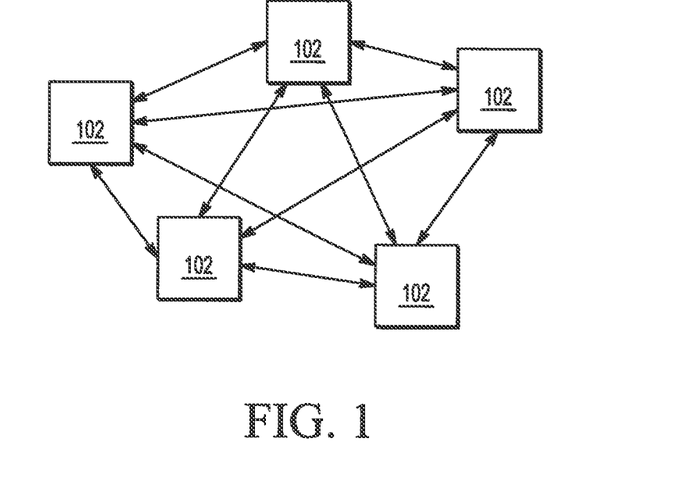
FIG. 1 is a block diagram of an example embodiment for a wireless network including multiple network nodes that adjust communication links based upon composite LQI (link quality indicator) measurements as described herein.

FIG. 1 is a block diagram of an example embodiment for a wireless network 100 including multiple network nodes 102. For this example embodiment, each network node 102 is configured to communicate packets within the wireless network 100 to other network nodes 102 in a mesh network topology. As described herein, network packets can be communicated through the wireless network 100 between two particular network nodes using multiple different communication paths. Each of these communication paths represent a communication link between two network nodes, and the communication links can be adjusted based upon the link quality for packets being received by the communicating network nodes. As further described herein, composite LQI measurements based upon signal strength measurements for received packets and based upon signal quality measurements for received packets are used to adjust the communication links Although five network nodes 102 are shown, different numbers of network nodes could be used. It is further noted that the network nodes can be any network connected device that is configured to receive and transmit packets within the wireless network 100. In addition, it is noted that while a mesh network topology is shown in FIG. 1 for the example embodiment of the wireless network 100, other network topologies could also be used, such as ring topologies, star topologies, and/or other topologies, while still taking advantage of the composite LQI measurements and related embodiments described herein.

Figure 2:
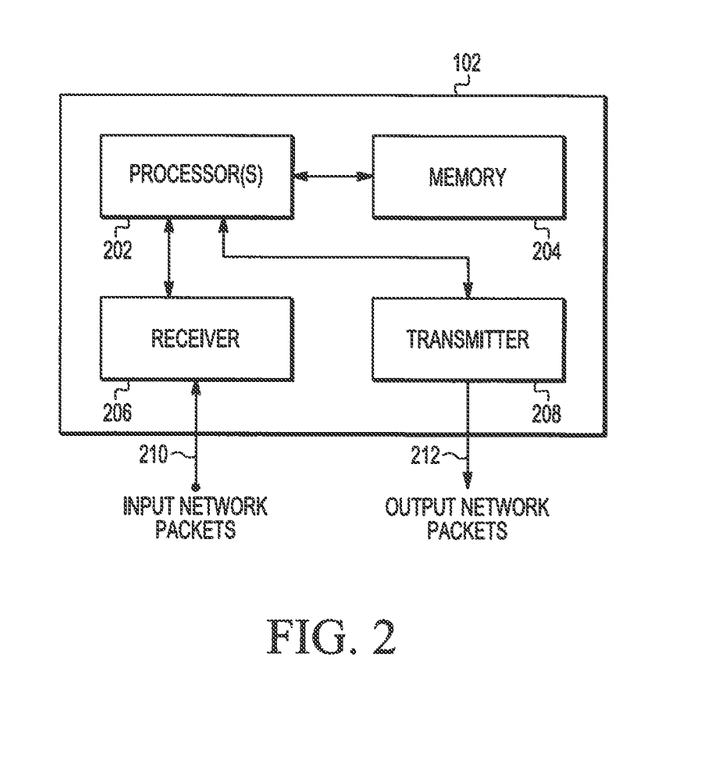
FIG. 2 is a block diagram of an example embodiment for a network node.

FIG. 2 is a block diagram of an example embodiment for a network node 102 within the wireless network 100. The network node 102 can be, for example, a network communication system that includes one or more processors 202 coupled to a memory 204, a receiver 206, and a transmitter 208. The receiver 206 receives input network packets 210 from other network nodes within the wireless network 100. The transmitter 212 transmits output network packets 212 to other network nodes within the wireless network 100. The receiver 206 can be any of a wide variety of wireless radio frequency (RF) receivers configured to receive RF signals encoded with digital symbols through one or more different modulation techniques (e.g., QPSK (quadrature phase shift keying), BPSK (binary phase shift keying, DSSS (direct sequence spread spectrum), FHSS (frequency hopping spread spectrum), OFDM (orthogonal frequency division multiplex), and/or other modulation techniques). The transmitter 208 can be any of a wide variety of wireless radio frequency (RF) transmitters configured to transmit RF signals encoded with digital symbols through one or more different modulation techniques (e.g., QPSK (quadrature phase shift keying), BPSK (binary phase shift keying, DSSS (direct sequence spread spectrum), FHSS (frequency hopping spread spectrum), OFDM (orthogonal frequency division multiplex), and/or other modulation techniques). Although not shown, the network node 102 can also include one or more antennas that are used for transmitting and receiving the RF signals. For certain embodiments, the receiver 206 and the transmitter 208 are configured to operate according to the IEEE Standard 802.15.4.

It is further noted that network node 102 including the one or more processors 202, receiver 206, and/or transmitter 208 can be implemented using one or more electronic circuits (e.g., central processing units (CPUs), controllers, microcontrollers, microprocessors, hardware accelerators, FPGAs (field programmable gate arrays), ASICs (application specific integrated circuits), and/or other programmable processing circuitry) that are programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

Figure 3:
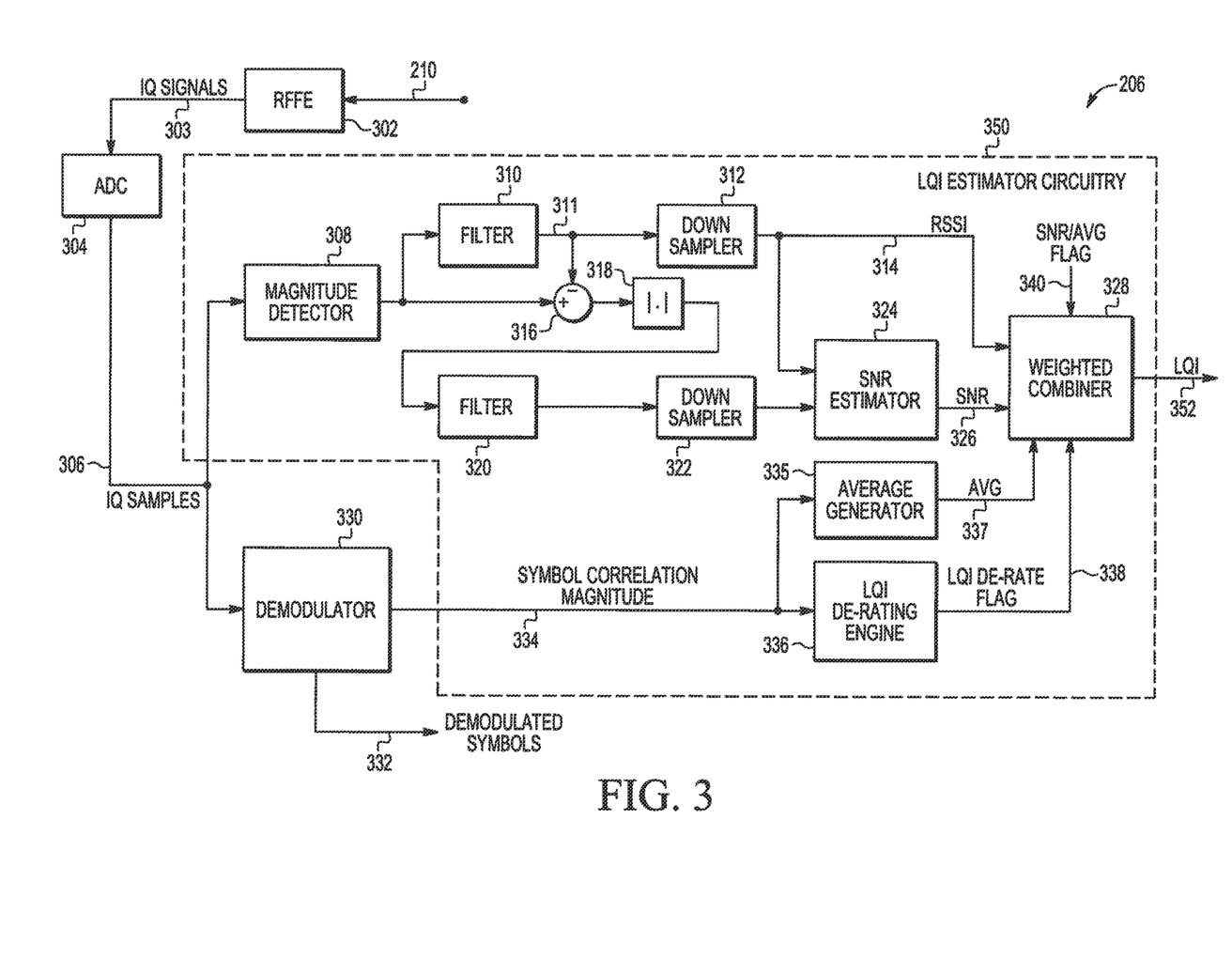
FIG. 3 is a block diagram of an example embodiment for a receiver for a network node that generates composite LQI measurements based upon RSSI (receive signal strength indicator) measurements and SNR (signal-to-noise ratio) measurements for the received packet communications.

FIG. 3 is a block diagram of an example embodiment for receiver 206. For this example embodiment, the input network packets 210 are received as radio frequency (RF) wireless communications by an RF front end (RFFE) 302. The RFFE 302 can include one or more mixers and/or filters that operate to down-convert the received signals to in-phase (I) and quadrature (Q) signals 303. These IQ signals 303 are then digitized by analog-to-digital converter (ADC) 304 to generate digital IQ samples 306. The digital IQ samples 306 are demodulated by demodulator 330, and the demodulator 330 outputs digital demodulated symbols 332, for example, that can be further processed by the processors 202 for the network node 102. The IQ samples 306 and symbol correlation magnitudes 334 associated with the demodulated symbols 332 are received by the LQI estimator circuitry 350. As described in more detail herein, the LQI estimator circuitry 350 operates to generate a composite LQI measurement 352 that is based upon a receive signal strength (RSSI) measurement 314 and is also based upon a signal-to-noise ratio (SNR) measurement 326 for the packet communication 210 being received by the receiver 206. These composite LQI measurements 352 generated for the packet communications 210 received by the network node 102 can then be used to adjust the communication link between the network node 102 and a separate network node 102 within the wireless network 100. For certain embodiments, it is also noted that the composite LQI measurements can be represented by digital values between a low digital value and a high digital value. For example, 8-bit digital values can be used to represent the composite LQI measurements which can range from a lowest value for the composite LQI value of 0x00 (i.e., 00 in hexadecimal, or 00000000 in binary) to a highest value for the composite LQI value is 0xFF (i.e., FF in hexadecimal, or 11111111 in binary). Other X-bit digital values and related representations can also be used while still taking advantage of the composite LQI measurements and related embodiments described herein.

Looking now in more particular to the LQI estimator circuitry 350, a magnitude path generates an RSSI measurement 314 for the received packet communications, and a noise path generates an SNR measurement 326 for the received packet communications. The RSSI measurement 314 and the SNR measurement 326 are then received and combined by combiner 328, which can be a weighted combiner, to generate the composite LQI measurement 352.

As described further below for certain embodiments, the combiner 328 can also receive an LQI de-rate flag 338 from a LQI de-rating engine 336. The LQI de-rating engine 336 receives the symbol correlation magnitudes 334 associated with the demodulated symbols 332 and outputs a de-rate flag 338 to adjust weights applied by the weighted combiner 328 to generate the composite LQI measurement 352. The weighted combiner 328 can also receive an average magnitude value 337 from an average generator 335. The average generator 335 receives the symbol correlation magnitudes 334 and generates the average magnitude value 337 based upon these symbol correlation magnitudes 334.

Looking back to FIG. 3, the magnitude path includes a magnitude detector 308, a filter 310, and a down sampler 312 that operate to generate the RSSI measurement 314. The magnitude detector 308 receives the digital IQ samples 306 and outputs a magnitude value to filter 310. The filter 310 can be configured to smooth the instantaneously calculated magnitude values. The down sampler 312 receives filtered magnitude values 311 from the filter 310 and outputs reduced rate magnitude values as the RSSI measurements 314. For example, the down sampler 312 can decimate the filtered magnitude values by a factor equal to the product between the baseband digital sampling clock frequency for the ADC 304 and the duration of the time window corresponding to one LQI measurement.

The noise path includes the magnitude detector 308, an adder 316, an absolute value detector 318, a filter 320, a down sampler 324, and an SNR estimator 324 that operate to generate the SNR measurement 324. The adder 316 subtracts the filter magnitude value 311 from the magnitude value output by magnitude detector 308 to generate a difference output that represents noise within the received packet communications. The absolute value detector 318 receives the difference output from adder 316 and outputs the absolute value of this difference (i.e., estimated noise magnitude) output to filter 320. The filter 320 can be configured to smooth the instantaneously estimated noise magnitude. The down sampler 322 receives the filtered noise values from the filter 320 and outputs reduced rate noise values to SNR estimator 324. For example, the down sampler 320 can decimate the filtered noise values by a factor equal to the product between the baseband digital sampling clock frequency for the ADC 304 and the duration of the time window corresponding to one LQI measurement. The SNR estimator receives these reduced rate noise values from the down sampler 322 and also receives the RSSI measurements 314 from the down sampler 312. The SNR estimator 324 then generates the SNR measurement 326 based upon the relative noise and signal level magnitudes.

The composite LQI measurement 352 output by the weighted combiner 328 is based upon the RSSI measurement 314 and the SNR measurement 326. The composite LQI measurement 352 can also be adjusted based upon a quality measurement associated with the demodulation performed by the demodulator 330 as a replacement value for the SNR measurement 326. For example, the average correlation magnitude (AVG) 337 can provide these quality measurements for demodulated digital symbols 332 output by the demodulator 330. The selection of whether to use the SNR measurement 326 or the average correlation magnitude (AVG) 337 is based upon an SNR/AVG flag 340 that is provided to the weighted combiner 328. In addition, the composite LQI measurement 352 can be based upon an LQI bias. For example, the following equation can be used to generate the composite LQI measurement 325 where the combiner 328 is implemented as a weighted combiner:

$$\text{Composite LQI} = \text{RSSI} * W_{RSSI} + (\text{SNR or AVG}) * W_{SNR} + \text{LQI}_{BIAS}$$

For this equation, the RSSI measurement 314 is multiplied by an RSSI weight ($W_{RSSI}$), and the SNR measurement 326 or the average correlation magnitude (AVG) 337 is multiplied by a SNR weight ($W_{SNR}$). In addition if used, a bias value ($LQI_{BIAS}$) is also applied to adjust the ordinate axis for the resulting composite LQI measurement 352, for example, to account for the sensitivity threshold for the receiver 206. Further, the LQI de-rate flag 338 can be used to force the composite LQI to zero based upon its logic state, as described in more detail with respect to FIG. 4 below. For example, when the LQI de-rate flag 338 is asserted (e.g., logic value 1), the composite LQI can be set to zero. When the LQI de-rate flag 338 is not asserted (e.g., logic value 0), the composite LQI is determined as described herein. Other logic states and variations could also be used.

It is noted that weights and bias values can be selected and adjusted, as desired, depending upon the network environment. TABLE 1 below provides example values that can be used.

TABLE 1

EXAMPLE VALUES FOR WEIGHT AND BIAS VALUES

| Parameter | Description | Example Values |
| --- | --- | --- |
| $W_{RSSI}$ | Weight for RSSI | $2 \le W_{RSSI} < 3$ |
| $W_{SNR}$ | Weight for SNR | $1 \le W_{SNR} < 3$ |
| $LQI_{BIAS}$ | Bias value for LQI | $-16 \le LQI_{BIAS} < 15)$ |

Figure 4:
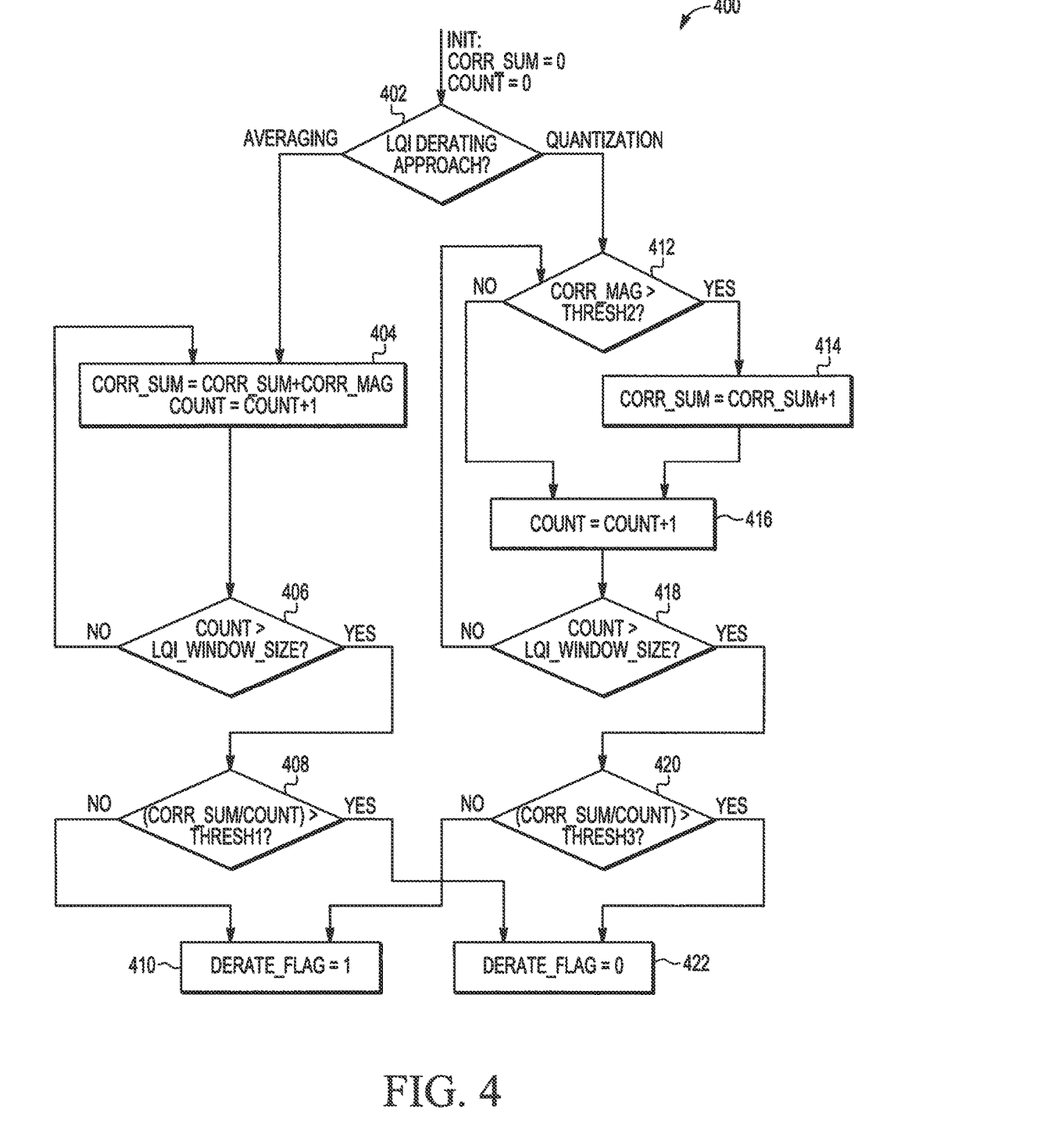
FIG. 4 is a process flow diagram of an example embodiment for an LQI de-rating engine that determines the state of a correlation de-rate flag used to disregard LQI measurements due to poor demodulator performance.

FIG. 4 is a process flow diagram for an example embodiment 400 for operation of the LQI de-rating engine 336 that determines the de-rate correlation flag 338. When asserted, the de-rate correlation flag de-rates the LQI measurement 352 and sets it to 0 regardless of the RSSI measurement 314 and/or the SNR measurement 326 (or the AVG measurement 337 when used) effectively disregarding the LQI computation due to poor demodulation performance in the demodulator 330. For embodiment 400, the LQI de-rating engine 336 compares demodulation correlation magnitudes versus correlation thresholds to provide fast de-rating of the composite LQI measurement 352 if correlation magnitudes degrade abruptly, for example, due to unsuccessful demodulation.

The input to the LQI de-rating engine 336 is the symbol correlation magnitude (corr_mag) 334, which can be received, for example, at 62.5 kilo samples per second (kSps). Other parameters used within the process flow embodiment 400 include a correlation sum (corr_sum), a count (count), an LQI window length in symbols (lqi_window_size), a first threshold (Thresh1) for averaged correlation magnitude, a second threshold (Thresh2) for correlation magnitudes, and a third threshold (Thresh3) for percentage of magnitudes exceeding the second threshold (Thresh2).

Now looking in more detail to embodiment 400, prior to determination block 402, the corr_sum and the count are initialized to zero. In block 402, a determination is made whether to apply an averaging approach for LQI derating or to apply a quantization approach for LQI derating. If "averaging" is selected in block 402, then block 404 is reached where the correlation sum (corr_sum) is set to equal the current corr_sum plus the current symbol correlation magnitude (corr_mag) 334 from the demodulator 330. Also in block 404, the count is incremented such that the count is equal to the current count plus 1. In block 406, a determination is then made whether the count is greater than the LQI window length in symbols (lqi_window_size). If "NO," then flow passes back to block 404. If "YES," then flow passes to block 408. In block 408, a determination is made whether the correlation sum (corr_sum) divided by the count is greater than the first threshold (Thresh1). If "NO," then the de-rate flag 338 is set to "1" in block 410. If "YES," then the de-rate flag 338 is set to "0" in block 422. The selected de-rate flag 338 is then used as the binary weight ($W_{CORR}$) applied to the symbol correlation magnitude 334 in the equation above.

If "quantization" is selected in block 402, then a further determination is made in block 412 whether the symbol correlation magnitude (corr_mag) 334 from the demodulator 330 is greater than the second threshold (Thresh2). If "NO," then flow passes to block 416 where the count is incremented such that the count is equal to the current count plus 1. If "YES," then flow first passes to block 414 where the correlation sum (corr_sum) is incremented and set to equal the current corr_sum plus 1, and then block 416 is reached. From block 416, block 418 is reached where a determination is made whether the count is greater than the LQI window length in symbols (lqi_window_size). If "NO," then flow passes back to block 412. If "YES," then flow passes to block 420 where a determination is made whether the correlation sum (corr_sum) divided by the count is greater than the third threshold (Thresh3). If "NO," then the de-rate flag 338 is set to "1" in block 410. If "YES," then the de-rate flag 338 is set to "0" in block 422. The selected de-rate flag 338 is then used as the binary weight ($W_{CORR}$) applied to the symbol correlation magnitude 334 in the equation above.

TABLE 2 below provides example values for the parameters used within embodiment 400 to generate the de-rate flag 338.

TABLE 2

EXAMPLE VALUES FOR DE-RATING PARAMETERS

| Parameter | Description | Example Values |
| --- | --- | --- |
| lqi_window_size | Number of demodulated symbols selected for measurement window length for LQI measurements | 8 symbols (value can be varied as desired based upon modulation type and oversampling ratio) |
| Thresh1 | Normalized threshold for averaged correlation magnitudes | 0.6 (value can be varied between 0 and 1 depending upon implementation) |
| Thresh2 | Normalized threshold for correlation magnitudes | 0.6 (value can be varied between 0 and 1 depending upon implementation) |
| Thresh3 | Normalized threshold percentage of magnitudes exceeding the second threshold | 0.5 (value can be varied between 0 and 1 depending upon implementation) |

Figure 5:
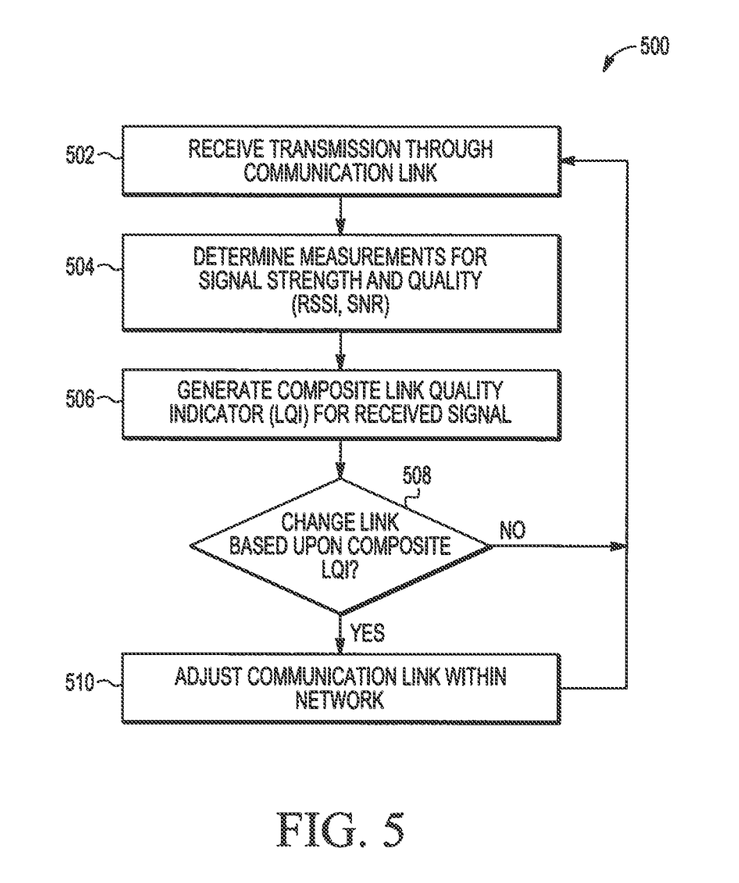
FIG. 5 is a process flow diagram of an example embodiment to adjust communication links for a network node based upon composite LQI measurements.

FIG. 5 is a process flow diagram of an example embodiment 500 to adjust communication links for a network node 102 based upon composite LQI measurements. In block 502, a packet communication is received by a network node 102 from a separate network node through a communication link within a wireless network. In block 504, measurements are determined for link quality including signal strength, such as RSSI measurement 314, and the signal quality, such as a noise level SNR measurement 326. In block 506, a composite LQI measurement is generated for the received signal based upon the signal strength measurements and the signal quality measurements (e.g., RSSI, SNR, AVG). As described above, in additional to the RSSI measurement 314 and the SNR measurement 326, average symbol correlation magnitude (AVG) 337, an LQI bias, and/or other link quality parameters can also be used, if desired, to generate the composite LQI measurement 352. In block 508, a determination is made whether to change the communication link based upon the composite LQI measurement 352. For example, the composite LQI measurement 352 can be compared to one or more threshold LQI values to determine whether or not the adjust the communication link. As described further below, a high LQI threshold and a low LQI threshold can be used, if desired, to adjust the communication link if the composite LQI rises above the high LQI threshold or drops below the desired low LQI threshold. If the determination in block 508 is "NO," then flow passes back to block 502. If the determination in block 508 is "YES," then flow passes to block 510 where the communication link within the wireless network is adjusted for the packet communications between the network 102 node and the separate network node. The adjustments to the communication link can include, for example, adjustments to the transmit/receive parameters for the communication link, adjustments to use different network nodes, and/or other desired adjustments.

Figure 6A:
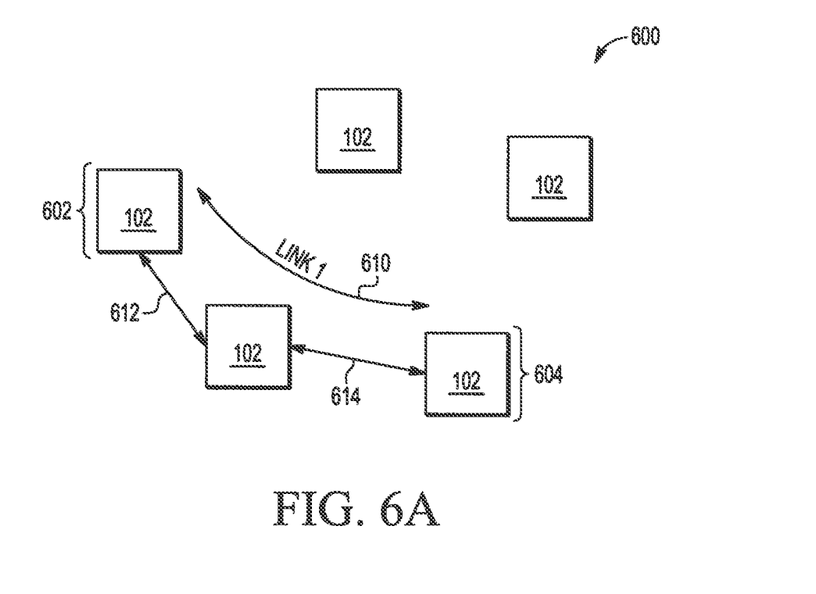
FIGS. 6A-6B are block diagrams of example embodiments where a first communication link has been adjusted to a second communication link based upon a composite LQI measurement generated by a network node.
Figure 6B:
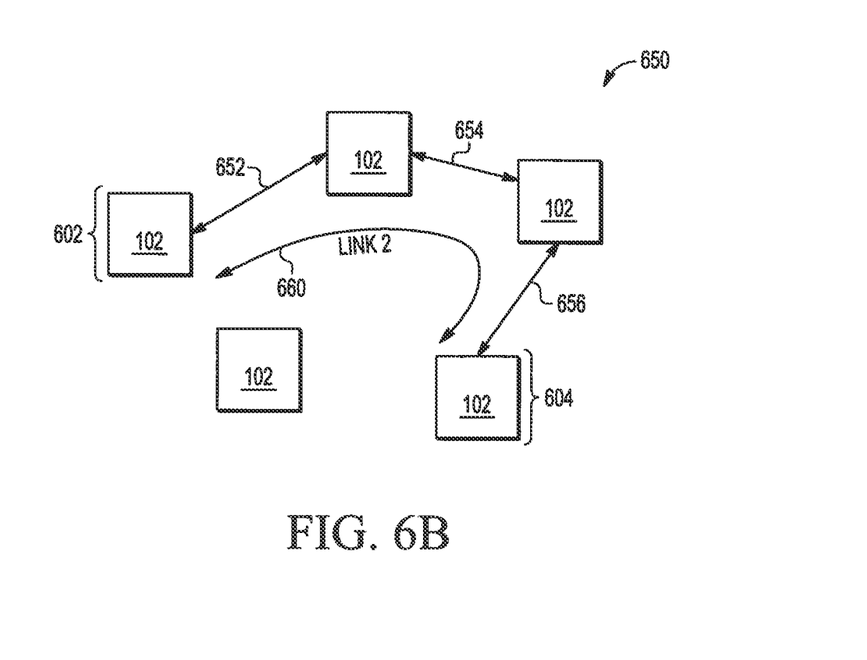

FIGS. 6A-6B are block diagrams of example embodiments where a first communication link (LINK1) 610 has been adjusted to a second communication link (LINK2) 660 based upon a composite LQI measurement 352 generated by a network node 102.

Looking first to FIG. 6A, an example embodiment 600 is shown where a network node 102 indicated by bracket 602 is communicating packets through communication link 610 with a separate network node 102 indicated by bracket 604. Communication link (LINK1) 610 includes packet communications through an intermediate network node 102 as indicated by communication paths 612 and 614. It is assumed that a determination has been made for the communication link (LINK1) 610 based upon a composite LQI measurement that the communication link (LINK1) 610 is not adequate for the packet communications and an adjustment should be made.

FIG. 6B represents an example embodiment 650 wherein the communication link has been adjusted to a second communication link (LINK2) 660 for the packet communications between the network nodes 102 indicated by brackets 602 and 604. The second communication link (LINK2) 660 includes packet communications through two intermediate network nodes 102 as indicated by communication paths 652, 654, and 656. It is noted that this example communication link adjustment has been made by a particular network node 102, for example, by sending its packet communications destined for another network node along a different path within the wireless network 100. With respect to FIGS. 6A-B, for example, the network node indicated by bracket 602 can adjust its communication link with the network node indicated by bracket 604 by using path 652 rather than the original path 612. The network node 102 receiving packets through this path 652 can generate an additional path, such as path 654. In turn, the network node 102 receiving packets through this path 654 can generate an additional path, such as path 656. This continues until the packet communication is received by the intended destination network node.

Figure 7:
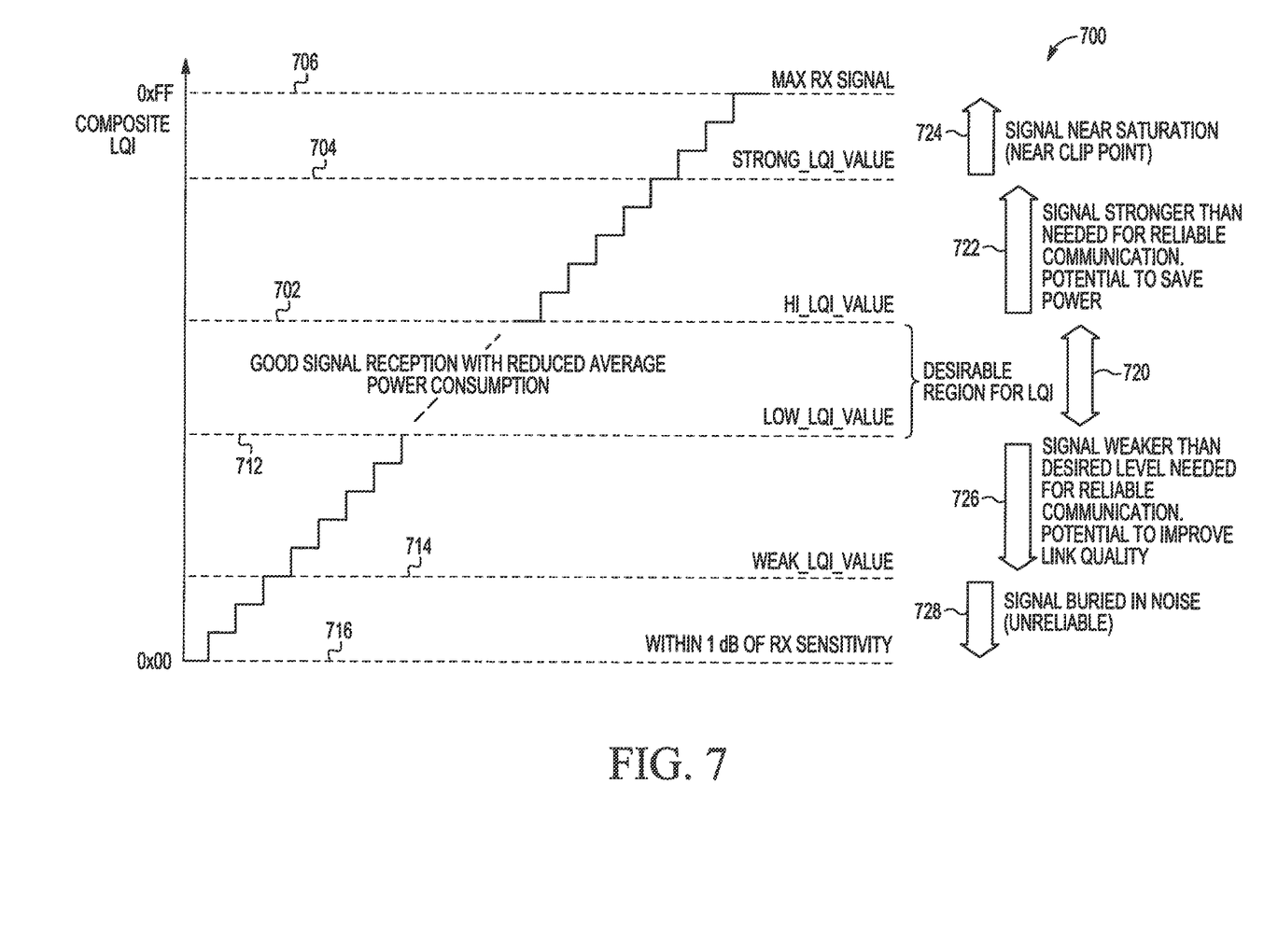
FIG. 7 is an example embodiment for different ranges of composite LQI values defined by LQI thresholds that can be used to trigger adjustments to communication links.

FIG. 7 is an example embodiment 700 for different ranges of composite LQI values associated with the LQI measurements 352 and related LQI threshold values that can be used to trigger adjustments to a communication link between two network nodes 102. For embodiment 700, it is assumed that the composite LQI measurement is an 8-bit value. The lowest value for the composite LQI value of 0x00 (i.e., 00 in hexadecimal, or 00000000 in binary) is associated with a signal level near the receive sensitivity (RX Sensitivity) for the receiver 206 as represented by dashed line 716 (e.g., within about 1 dB). The highest value for the composite LQI value is 0xFF (i.e., FF in hexadecimal, or 11111111 in binary) is associated with the maximum receive signal level (Max Rx Signal) for the receiver 206 as represented by dashed line 706. Two high level thresholds and two low level thresholds are also included in embodiment 700, namely, a strong composite LQI value (STRONG_LQI_VALUE) as represented by dashed line 704, a high composite LQI value (HI_LQI_VALUE) as represented by dashed line 702, a low composite LQI value (LOW_LQI_VALUE) as represented by dashed line 712, and a weak composite LQI value (WEAK_LQI_VALUE) as represented by dashed line 714. These threshold levels define five different operational regions 720, 722, 724, 726, and 728, respectively, for composite LQI measurements.

The region 720 represents a desirable region for the composite LQI value that is between the high LQI threshold 702 and the low LQI threshold 712. For this region 702, signal reception is good while still allowing reduced average power consumption by limiting transmission signal strengths. The region 722 represents a less desirable higher region for the composite LQI value that is between the strong LQI threshold 704 and the high LQI threshold 702. For this signal region 722, the received signal is stronger than needed for reliable communication thereby allowing for potential power savings. For example, adjustments can be made to reduce the transmit strengths for the communication link. The region 726 represents a less desirable lower region for the composite LQI value that is between the weak LQI threshold 714 and the low LQI threshold 712. For this signal region 726, the signal is weaker than a desired level needed for reliable communication thereby allowing for potential improvements to link quality. For example, adjustments can be made to increase the transmit strength for the communication links. The region 724 represents an undesirable region for the composite LQI value that is between the maximum receive signal level 706 and the strong LQI threshold 704. For this region 724, the signal level is near saturation and therefore the clip point for the receiver 206. The region 728 represents an undesirable region for the composite LQI value that is between the low sensitivity receive signal level 716 and the weak LQI threshold 714. For this region 728, the signal level is unreliable and potentially buried within noise levels for the communication link. For the two undesirable regions 724 and 728, adjustments can again be made to the transmit/receive parameters and/or a new communication link can be formed with a different network node to improve link quality for the network packet communications within the wireless network 100.

Figure 8:
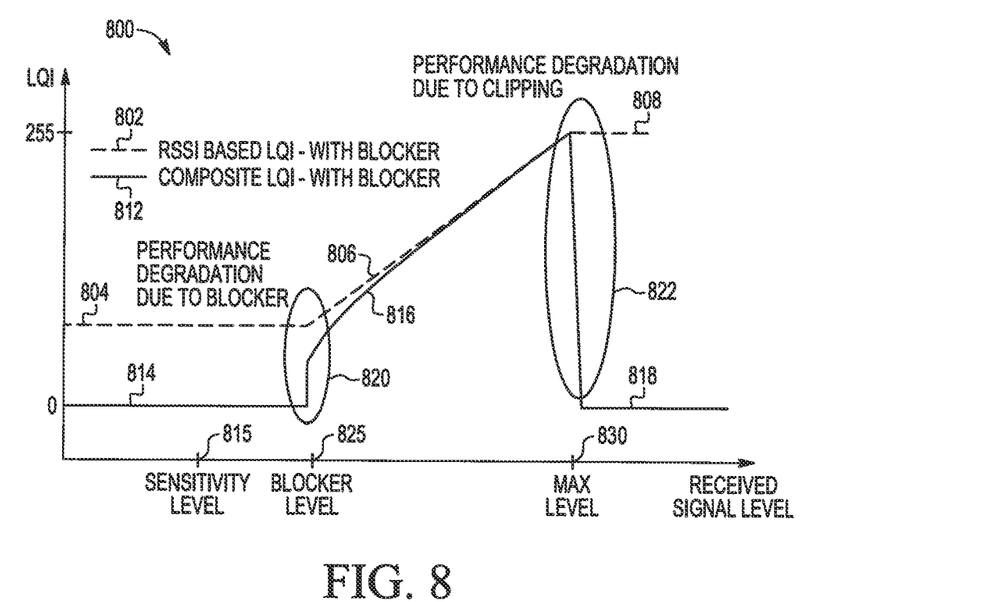
FIG. 8 is an example embodiment for a diagram that compares prior RSSI-based LQI measurements to the composite LQI measurements as described herein where received packet communications are in the presence of an interfering blocker signal.

FIG. 8 is an example embodiment 800 for a diagram that compares prior RSSI-based LQI measurements 802 to the composite LQI measurements 812 as described herein where received packet communications are in the presence of an interfering blocker signal. For embodiment 800, the x-axis represents signal level for the desired signal without the blocker energy, and the y-axis represents an LQI value from 0 to 255 (e.g., 00 in hexadecimal, to FF in hexadecimal). Initially, when the signal level is below the sensitivity level 815 and below the blocker level 825, the prior RSSI-based LQI measurement still provides an LQI well above 0 as shown by line segment 804 because this prior RSSI-based LQI measurement does not adequately differentiate between blocker signal levels and desired signal levels. In contrast, the composite LQI measurement of the current embodiments provides a composite LQI measurement near or at 0 as represented by line segment 814. Once the desired signal level actually rises above the blocker level 825 as indicated by region 820, the composite LQI measurement rises, and the two LQI measurements become similar as shown by line segments 806 and 816. However, once the desired signal level rises above the maximum receive level 830 as indicated by region 822, the RSSI-based LQI measurement remains near the maximum LQI level of 255 as indicated by line segment 808 while the composite LQI measurement drops to near the minimum LQI level of 0 as indicated by line segment 818. As such, it is seen that the composite LQI measurement 812 provides a more accurate indication of the true signal level in the presence of a blocker at lower signal levels where performance degradation will occur due to the blocker, for example, in region 820. It is also seen that the composite LQI measurement provides a more accurate indication of poor link quality when the signal level rises above the maximum receive level wherein performance degradation will occur due to clipping, for example, in region 822.

Figure 9:
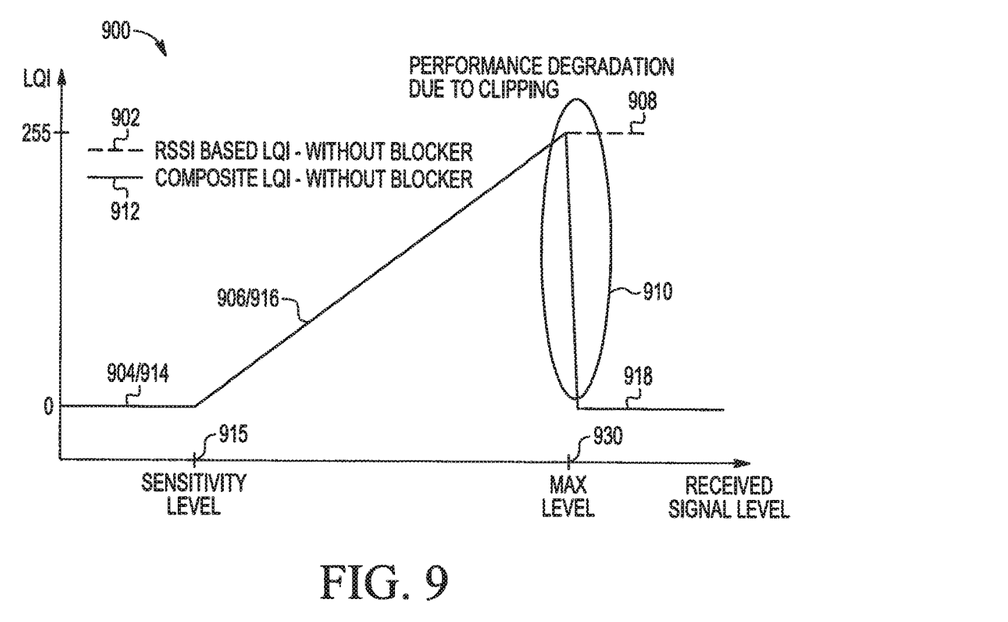
FIG. 9 is an example embodiment for a diagram that compares prior RSSI-based LQI measurements to the composite LQI measurements as described herein where packet communications are received without a blocker.

FIG. 9 is an example embodiment 900 for a diagram that compares prior RSSI-based LQI measurements 902 to the composite LQI measurements 912 as described herein where packet communications are received without a blocker. For embodiment 900, the x-axis represents received signal level for the desired signal, and the y-axis represents the LQI measurement from 0 to 255 (e.g., 00 in hexadecimal, to FF in hexadecimal). Initially, when the desired signal level is below the sensitivity level 915, the prior RSS-based LQI measurement and the composite LQI measurement will provide an LQI measurement near or at 0 as represented by line segments 904/914. Once the desired signal level rises above the sensitivity level 815, the RSSI-based LQI measurement and the composite LQI measurement will both rise similarly as shown by line segments 906/916. However, once the desired signal level rises above the maximum receive level 930 as indicated by region 910, the RSSI based LQI measurement stays near the maximum LQI level of 255 as indicated by line segment 908 while the composite LQI measurement drops to near the minimum LQI level of 0 as indicated by line segment 918. As such, it is again seen that the composite LQI measurement provides a more accurate indication of poor link quality when the signal level rises above the maximum receive level wherein performance degradation will occur due to clipping, for example, in region 910.

As described herein, a variety of embodiments can be implemented and different features and variations can be implemented, as desired.

For one embodiment, a method to adjust a communication link for a network node in a wireless network is disclosed including receiving packet communications through a wireless communication link from a separate network node within a wireless network, measuring signal strength for the received packets to produce signal strength measurements, measuring signal quality for the received packets to produce signal quality measurements, generating composite LQI (link quality indicator) measurements for the received packet communications based upon the signal strength measurements and the signal quality measurements, and adjusting the wireless communication link based upon the composite LQI measurements.

In additional embodiments, the method also includes adjusting the wireless communication link when the composite LQI measurement rises above a high threshold level or drops below a low threshold level. In further embodiments, the signal strength measurements includes RSSI (receive signal strength indicator) measurements based upon a detected magnitude for the received packet communications. In still further embodiments, the signal quality measurements include SNR (signal-to-noise ratio) measurements based upon a detected magnitude for the received packet communications and a detected magnitude for noise within the received packet communications. In further embodiments, the method further includes demodulating the received packet communications, and the signal quality measurements include quality measurements associated with the demodulating.

In additional embodiments, the method also includes generating the composite LQI measurements by applying a first weight to the signal strength measurements and by applying a second weight to the signal quality measurements. In further embodiments, the composite LQI measurements are further based upon LQI bias values.

In additional embodiments, the method also includes demodulating the received packet communications to generate demodulated digital symbols and generating symbol correlation magnitudes for the demodulated digital symbols. In further embodiments, the signal quality measurements include average symbol correlation magnitudes. In still further embodiments, the method includes derating the composite LQI measurements when demodulating quality falls below a threshold based upon the symbol correlation magnitudes. For example, the LQI composite measurement may be derated to 0 (zero), if the demodulation quality is poor to indicate an unreliable network link.

For another embodiment, a network node for a wireless network is disclosed including a receiver and one or more processors. The receiver is configured to receive packet communications through a wireless communication link from a separate network node within a wireless network and to generate composite LQI measurements for the received packet communications where the composite LQI measurements are based upon signal strength measurements for the received packet communications and signal quality measurements for the received packet communications. The one or more processors are programmed to receive the composite LQI measurement as an input and to adjust the wireless communication link based upon the composite LQI measurement.

In additional embodiments, the one or more processors are further programmed to adjust the communication link when the composite LQI measurement rises above a high threshold level or drops below a low threshold level. In further embodiments, the signal strength measurements include RSSI (receive signal strength indicator) measurements based upon a detected magnitude for the received packet communications. In still further embodiments, the signal quality measurements include SNR (signal-to-noise ratio) measurements based upon a detected magnitude for the received packet communications and a detected magnitude for noise within the received packet communications. In further embodiments, the network node also includes a demodulator having as outputs demodulated digital symbols based upon the receive packet communications, and the signal quality measurements include quality measurements associated with the demodulator outputs.

In additional embodiments, the receiver is configured to generate the composite LQI measurements by applying a first weight to the signal strength measurements and by applying a second weight to the signal quality measurements. In further embodiments, the composite LQI measurements are further based upon LQI bias values.

In additional embodiments, the network node further includes a demodulator having as outputs demodulated digital symbols based upon the received packet communications and symbol correlation magnitudes associated with the demodulated digital symbols. In further embodiments, the signal quality measurements include average symbol correlation magnitudes. In still further embodiments, the receiver is further configured to de-rate the composite LQI measurements when demodulating quality falls below a threshold based upon the symbol correlation magnitudes. For example, the LQI composite measurement may be de-rated to 0 (zero), if the demodulation quality is poor to indicate an unreliable network link.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method to adjust a communication link for a network node in a wireless network, comprising:
receiving packet communications through a wireless communication link from a separate network node within a wireless network;

measuring signal strength for the received packets to produce signal strength measurements;
measuring signal quality for the received packets to produce signal quality measurements;
generating composite LQI (link quality indicator) measurements for the received packet communications based upon the signal strength measurements and the signal quality measurements, wherein each composite LQI is generated by applying a first weight to the signal strength measurement and a second weight to the signal quality measurement and combining the weighted signal strength measurement with the weighted signal quality measurement; and
adjusting the wireless communication link based upon the composite LQI measurements.

2. The method of claim 1, further comprising adjusting the wireless communication link when the composite LQI measurement rises above a high threshold level or drops below a low threshold level.

3. The method of claim 1, wherein the signal strength measurements comprise RSSI (receive signal strength indicator) measurements based upon a detected magnitude for the received packet communications.

4. The method of claim 1, wherein the signal quality measurements comprise SNR (signal-to-noise ratio) measurements based upon a detected magnitude for the received packet communications and a detected magnitude for noise within the received packet communications.

5. The method of claim 1, further comprising demodulating the received packet communications, and wherein the signal quality measurements comprise quality measurements associated with the demodulating.

6. The method of claim 1, wherein the composite LQI measurements are further based upon LQI bias values.

7. The method of claim 1, further comprising demodulating the received packet communications to generate demodulated digital symbols and generating symbol correlation magnitudes for the demodulated digital symbols.

8. The method of claim 7, wherein the signal quality measurements comprise average symbol correlation magnitudes.

9. The method of claim 7, further comprising derating the composite LQI measurements when demodulating quality falls below a threshold based upon the symbol correlation magnitudes.

10. A network node for a wireless network, comprising:
a receiver configured to receive packet communications through a wireless communication link from a separate network node within a wireless network and to generate composite LQI measurements for the received packet communications, the composite LQI measurements being based upon signal strength measurements for the received packet communications and signal quality measurements for the received packet communications, wherein each composite LQI is generated by applying a first weight to the signal strength measurement and a second weight to the signal quality measurement and combining the weighted signal strength measurement with the weighted signal quality measurement; and
one or more processors programmed to receive the composite LQI measurement as an input and to adjust the wireless communication link based upon the composite LQI measurement.

11. The network node of claim 10, wherein the one or more processors are further programmed to adjust the communication link when the composite LQI measurement rises above a high threshold level or drops below a low threshold level.

12. The network node of claim 10, wherein the signal strength measurements comprise RSSI (receive signal strength indicator) measurements based upon a detected magnitude for the received packet communications.

13. The network node of claim 10, wherein the signal quality measurements comprise SNR (signal-to-noise ratio) measurements based upon a detected magnitude for the received packet communications and a detected magnitude for noise within the received packet communications.

14. The network node of claim 10, further comprising a demodulator having as outputs demodulated digital symbols based upon the receive packet communications, and wherein the signal quality measurements comprise quality measurements associated with the demodulator outputs.

15. The network node of claim 10, wherein the composite LQI measurements are further based upon LQI bias values.

16. The network node of claim 10, further comprising a demodulator having as outputs demodulated digital symbols based upon the received packet communications and symbol correlation magnitudes associated with the demodulated digital symbols.

17. The network node of claim 16, wherein the signal quality measurements comprise average symbol correlation magnitudes.

18. The network node of claim 16, wherein the receiver is further configured to de-rate the composite LQI measurements when demodulating quality falls below a threshold based upon the symbol correlation magnitudes.

* * * * *